March 16, 1965 A. HIMY ETAL 3,173,808
HERMETICALLY SEALED BATTERY CELL AND PROCESS FOR MAKING SAME
Filed Feb. 24, 1960

ALBERT HIMY
RENATO DIPASQUALE
INVENTORS

BY
*Karl F. Ross*
AGENT 3,173,808
HERMETICALLY SEALED BATTERY CELL AND PROCESS FOR MAKING SAME
Albert Himy, Elmhurst, N.Y., and Renato Di Pasquale, Rutherford, N.J., assignors to Yardney International Corp., New York, N.Y., a corporation of New York
Filed Feb. 24, 1960, Ser. No. 10,749
6 Claims. (Cl. 136—6)

Our present invention relates to hermetically sealed electrochemical battery cells of the type generally referred to as "button cells."

It is an object of our invention to provide a button cell of improved construction wherein an electrochemical system may be hermetically sealed to prevent the escape of fluids (e.g. evolved gas or electrolyte) therefrom.

It is also an object of this invention to provide a simplified process for producing a cell of this type.

In accordance with a feature of the invention, we form a button cell by enclosing a cell pack in a casing produced by joining a first casing member to a second casing member in a fluid-tight manner. Advantageously, one of the members serves as the electrical contact for the positive plates of the cell while the other member serves as the electrical contact for the negative plates. For simple and effective cell construction, the casing members may be drawn into a cup-like configuration from conductive sheet material and insulatedly fitted one into the other, whereupon the casing may be hermetically sealed by cementing or fusing the members together along their abutting surfaces.

According to another feature of the invention, the sheet material is a metal-plastic laminate. Its preferably thermoplastic non-conductive layer, which may be bonded to the metal (e.g. copper) under heat and/or pressure, serves to insulate the casing members electrically from each other. Such a casing may be sealed by a cementing, heat-sealing, ultrasonic-welding or high-frequency fusion process adapted to join the thermoplastic layers of each juxtaposed member to the other. We have found that suitable thermoplastic materials include polystyrene, polyvinyl-chloride resins, tetrafluoroethylene resins (e.g. "Teflon"), and synthetic elastomers such as neoprene or polyethylene.

According to still another feature of our invention, we provide a rechargeable electrochemical system for a hermetically sealed cell designed to evolve negligible quantities of gas during charge and discharge and, thus, to prevent the build-up of internal pressures which tend to cause leakage. To this end, we make use of a cell pack incorporating silver positive plates and cadmium-oxide negative plates, separated from each other by an electrolyte-permeable membrane such as cellophane. The silver is, upon charging in the alkaline electrolyte, converted to silver oxide while the cadmium oxide is converted to cadmium. It will be apparent that, since cadmium does not go into solution readily, hydrogen evolution in the cell is effectively minimized. We have found further than the provision of an excess of cadmium oxide on the negative plates results in oxygen evolution, to the exclusion of hydrogen development, upon an overcharging of the cell. The oxygen thus released at the positive plates reacts with the metallic cadmium at the negative electrodes to form cadmium oxide at a rate substantially equal to the concurrent reduction of the excess of cadmium oxide originally provided, hence a cell so constituted may be overcharged indefinitely without further alteration of the electrochemical balance.

Advantageously, the excess of cadmium oxide is limited to the range of approximately 0.1 to 1 ampere-hour equivalent.

Furthermore, it is believed that any evolved oxygen trapped within the cell pack or forming a surrounding atmosphere will combine with a deposit of highly reactive cadmium resulting from a reduction of the excess cadmium oxide.

The above and other objects, features and advantages of our invention will become more readily apparent from the following description, reference being made to the accompanying drawing in which.

Figure 1:
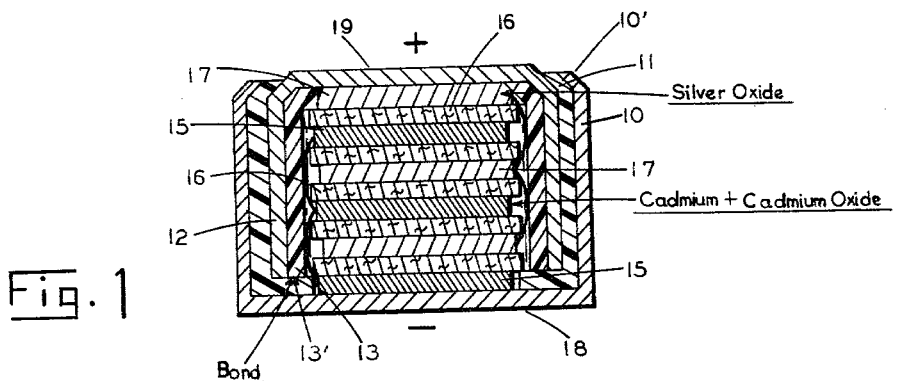
FIG. 1 is an axial cross-sectional view of a button cell according to the invention.

The button cell illustrated in FIG. 1 comprises a housing formed from an outer cup-shaped casing member 10 whose lower end surface 18 constitutes the negative pole of the cell, and a similar but inverted inner casing member 12, nested in the outer casing member 10, whose upper end surface 19 constitutes the positive pole of the cell. The members 10 and 12 may consist of steel or other suitable metal. Inner member 12 is provided with a thermoplastic laminate along its internal wall to form an insulating layer 13 between the latter and the cell pack, while the slightly larger outer member 10 is provided with a similar layer 11 along its internal wall and on a portion of its base to insulate the two casing members 10, 12 from each other. The upper edge 10' of member 10 is crimped against inner member 12 to secure the latter in place and to apply the desired pressure to the cell pack contained between the two members. The thermoplastic layers 11 and 13, which may be of like or different plastic materials (e.g. tetrafluoroethylene resin), are hermetically sealed to one another by one of the aforementioned processes at their abutting surface 13'.

The cell pack comprises three parallel-connected negative plates 15, the lowermost of which rests against a portion of the base of outer member 10 free from the insulating laminate to provide an electrical connection between the negative pole 18 and the negative plates 15. Similarly, three parallel-connected positive plates 17 are provided and alternate with the negative plates 15. The uppermost of positive plates 17 rests against an unlaminated portion of inner member 12 to provide electrical connection with the positive pole 19. Positive plates 17 and negative plates 15 are separated from each other by intermediate layers 16 of an electrolyte-permeable sheet material, such as regenerated cellulose. The interstices of the cell pack are permeated by an alkaline electrolyte, preferably a concentrated solution of potassium hydroxide. In the fully charged condition of the cell, the active material of positive plates 17 is silver oxide while the active material of negative plates 15 consists of cadmium and cadmium oxide. We have found that a hermetically sealed button cell adapted to exhibit minimum gassing, and having a rated capacity of one ampere-hour, requires positive plates 17 provided with 1 ampere-hour equivalent of silver oxide and negative plates 15 provided with 1 ampere-hour equivalent of metallic cadmium and an excess of cadmium oxide amounting to approximately 0.5 ampere-hour equivalent.

Sufficient pressure is exerted upon the end electrodes of the stack 15–17 by the circular terminal portions of members 10 and 12 to provide good electrical contact therebetween and to maintain the semi-permeable separators 16 compressed to prevent undue dilation of their interstices.

Figure 2:
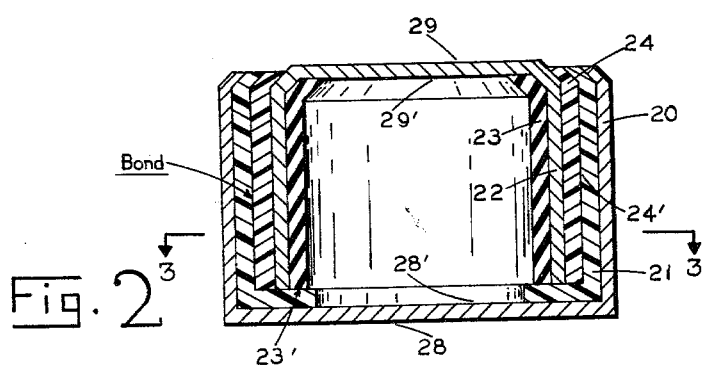
FIG. 2 is a view similar to FIG. 1 of a modified cell, with the cell pack thereof removed.
Figure 3:
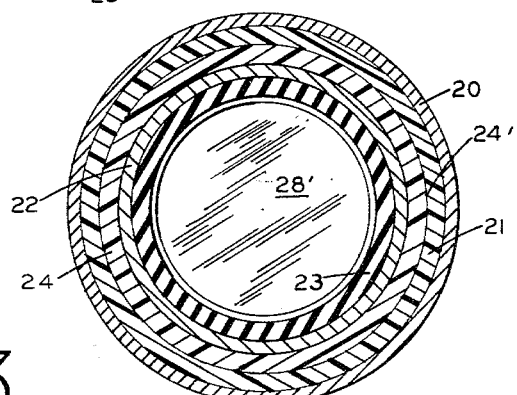
FIG. 3 is a cross-sectional view taken along line 3—3 of FIG. 2.

In FIGS. 2 and 3 we show a modified cell casing comprising an outer member 20 whose lower end surface 28 acts as the negative pole as described with reference to casing 10, and whose inner surface 28' is adapted to provide electrical contact for the negative plates. The member 20 is provided with a thermoplastic laminate 21 (e.g. of polyvinyl chloride) whose exposed surface contacts a thermoplastic laminate 24 of like or different material provided on the outer wall of an inner casing member 22. The inner wall of casing member 22 is provided with an insulating layer 23, preferably of neoprene rubber, to prevent electrical bridging of the cell pack. The upper end surface 29 of inner member 22 acts as the positive pole of the cell while its inner end surface 29', not covered by an insulating laminate, permits electrical connection with the positive plates. Although no cell pack is shown, it will be understood that the electrode assembly shown in FIG. 1 is suitable as well for the embodiment illustrated in FIGS. 2 and 3. The cell casing of the latter may be hermetically sealed along the interface 24' between layers 21 and 24, and along abutting surface 23' between the neoprene layer 23 and the layer 21.

Figure 4:
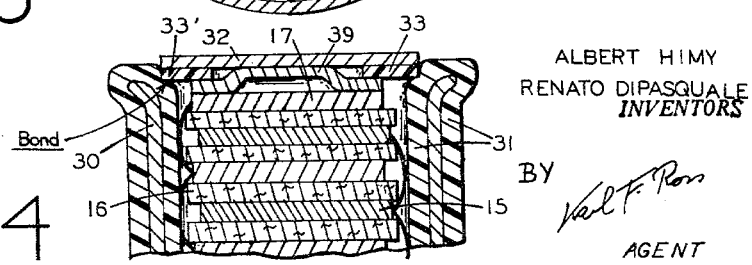
FIG. 4 is a fragmentary cross-sectional view of a further modification.

The assembly shown in FIG. 4 comprises as its outer member a steel can 30 which differs from the cup-shaped members 10 and 20 of the preceding embodiments in that its plastic layer 31 extends over both its inner and outer peripheries as well as around its upper edge, thereby preventing the accidental short-circuiting of the cell by a conductive external object. The inner member 32 has been reduced in this embodiment to a flat steel plate overlying the electrode stack 15, 16, 17 and bearing an annular plastic layer 33 bonded, again preferably by thermal fusion, to the layer 31 at 33'. It will be noted that the can 30 is bent outwardly near its mouth to form a seat for the plate 32 which is conductively connected to the top positive plate 17 of the stack through the intermediary of a dished contact disk 39 which may be of silver; a similar disk (not shown), e.g. of nickel, may be inserted between the bottom of can 30 and the lowermost (negative) electrode of the stack. These disks, made from a material which is substantially inert with respect to the adjacent electrodes, may also consist of a more resilient alloy (e.g. magnesium-silver) for improved contact pressure.

The invention as illustrated and described is believed to admit of other modifications and variations within the ability of persons skilled in the art and intended to be included within the spirit and scope of our invention, except as further limited by the appended claims. Thus, for example, some of the features herein disclosed will be applicable to battery cells in which the active materials of the electrodes represent a different couple, e.g. cadmium and nickel. Moreover, the housing members 10, 20, 30 and 12, 22, 32 may be given an outline other than circular, e.g. square or rectangular.

We claim:

1. A process for making an electrochemical battery cell, comprising the steps of forming a first cup-shaped metallic member with a non-conductive layer bonded to at least its inner peripheral surface, introducing into said member a stack of alternately negative and positive electrodes with intervening electrolyte-permeable separators along with a liquid electrolyte, fitting said first member into a slightly larger second cup-shaped metallic member having a non-conductive layer bonded to its inner peripheral surface, one of said layers being formed with a radial annular flange extending along the bottom of said second member, and joining said members together into a fluid-tight housing by bonding said layers to each other along said annular flange, thereby establishing contact pressure between exposed end portions of said metallic members and respective end electrodes of opposite polarities of said stack.

2. A process according to claim 1 wherein said layers consist of thermoplastic material and are bonded to each other by thermal fusion.

3. An electrochemical battery cell comprising a cup-shaped metallic outer member with a non-conductive peripheral layer bonded to its inner peripheral surface, a cup-shaped metallic inner member invertedly inserted into the open end of said outer member and having a non-conductive layer bonded to its inner peripheral surface, said layers being bonded together in a fluid-tight manner through the intermediary of an integral annular flange of non-conductive material extending radially along the bottom of said outer member whereby a sealed housing is formed, an electrode stack held under pressure in said housing and including an end electrode of one polarity conductively connected to the inner end surface of said first member and an end electrode of opposite polarity conductively connected to an inner surface of said second member axially spaced from said end surface, and an electrolyte in said housing irrigating said electrodes.

4. A cell according to claim 3, further comprising a conductive spacer interposed between at least one of said members and said stack.

5. A cell according to claim 4 wherein said spacer is in contact with one of said end electrodes and is substantially inert with respect thereto.

6. A process according to claim 2 wherein said thermoplastic material is polyvinyl chloride.

References Cited in the file of this patent
UNITED STATES PATENTS

| | | |
|---|---|---|
| 2,601,267 | Ellis | June 24, 1952 |
| 2,816,153 | Kort | Dec. 10, 1957 |
| 2,934,580 | Neumann | Apr. 26, 1960 |
| 2,934,581 | Dassler | Apr. 26, 1960 |
| 2,942,054 | Jeannin | June 21, 1960 |
| 2,980,747 | Daley | Apr. 18, 1961 |